F. RICHARD.
OILING DEVICE.
APPLICATION FILED MAR. 10, 1917.
1,348,664.
Patented Aug. 3, 1920.
2 SHEETS—SHEET 1.
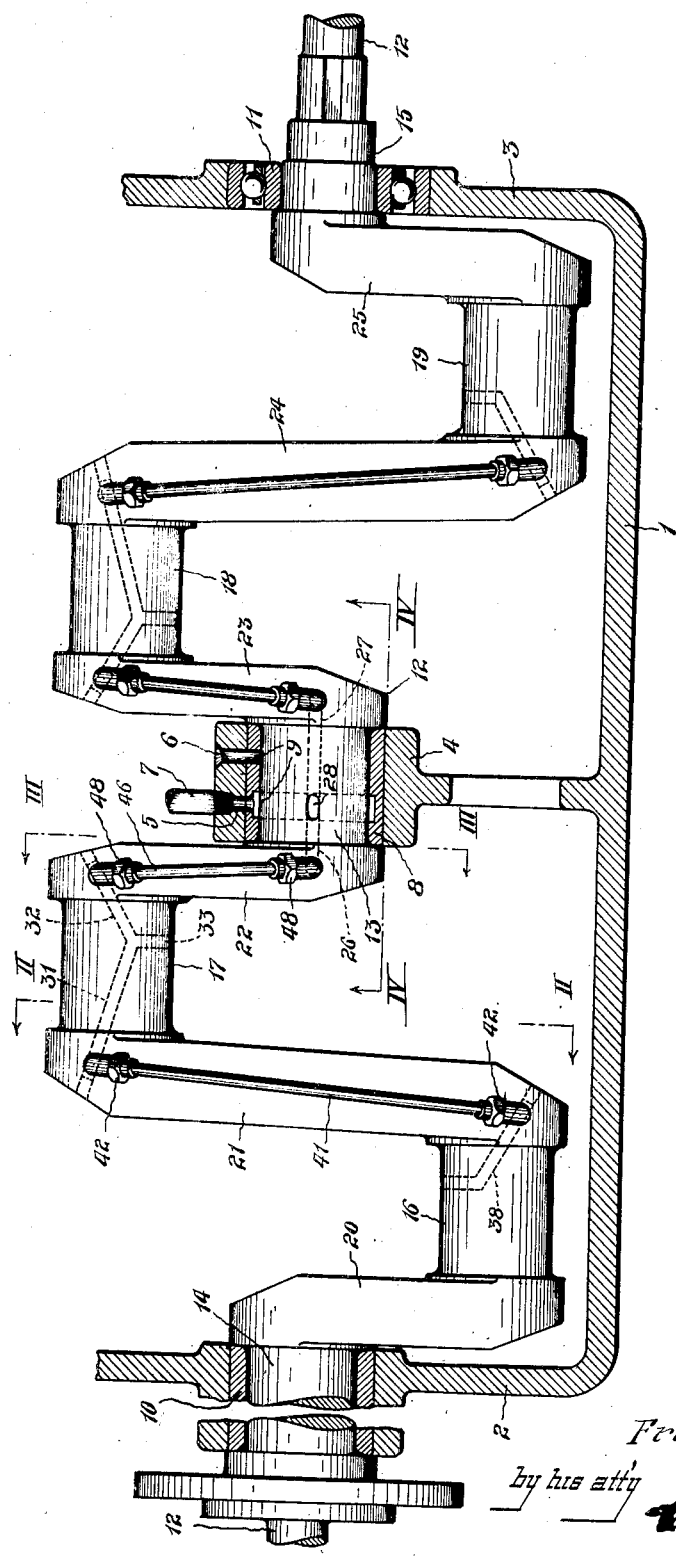
Fig. I.
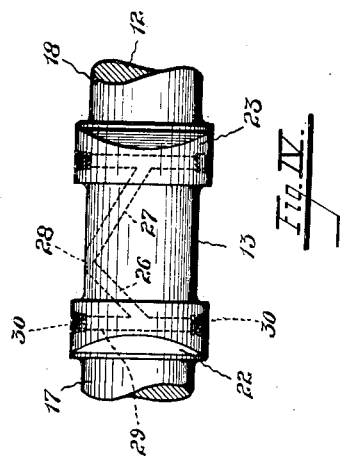
Fig. IV.
Inventor:
François Richard
by his atty F. RICHARD.
OILING DEVICE.
APPLICATION FILED MAR. 10, 1917.
1,348,664.
Patented Aug. 3, 1920.
2 SHEETS—SHEET 2.
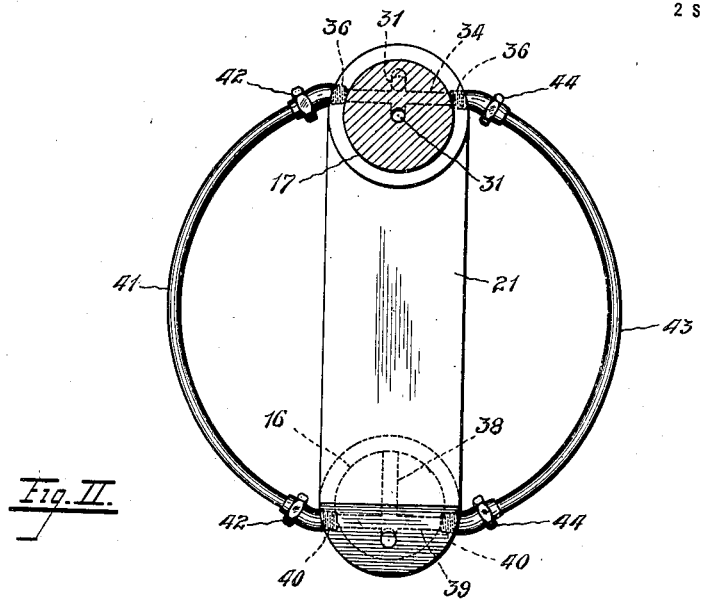
Fig. II.
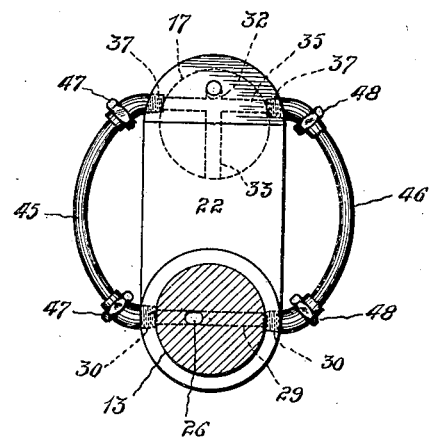
Fig. III.
Inventor:
François Richard
by his atty

UNITED STATES PATENT OFFICE.

FRANÇOIS RICHARD, OF CLEVELAND, OHIO, ASSIGNOR TO THE RICHARD AUTO MFG. COMPANY, OF CLEVELAND, OHIO.

OILING DEVICE.

1,348,664.  Specification of Letters Patent.  Patented Aug. 3, 1920.

Application filed March 10, 1917. Serial No. 154,037.

*To all whom it may concern:*

Be it known that I, FRANÇOIS RICHARD, a citizen of the Republic of France, residing at 7800 Finney avenue, Cleveland, in the county of Cuyahoga and State of Ohio, have invented a new and useful Improvement in Oiling Devices, of which the following is a specification, the principle of the invention being herein explained and the best mode in which I have contemplated applying that principle, so as to distinguish it from other inventions.

My present invention relates broadly to an oiling device, more particularly to an arrangement and configuration of a conduit for conducting the lubricant to or from a revoluble journal such that centrifugal force, which might otherwise tend to retard its flow, is counteracted.

The exemplification selected for illustration in the drawings pertains to a multiple crank shaft such as is in common use in a four cylinder four cycle type of automobile engine. It is old to provide both the journals and the connecting crank arms with intercommunicating ducts for the distribution of oil to the several wearing surfaces of the journals. Heretofore, however, so far as my knowledge extends, the flow of oil from one journal to another has followed a substantially direct course through the crank arm so that centrifugal action was encountered and the desired continuity of flow frequently interrupted. This objectionable tendency, till now prevalent as I believe, has been taken advantage of to assist in insuring a flow of oil from a rotary journal to a revoluble journal. When, however, the conditions are reversed and it becomes desirable to insure a substantially continuous flow of oil from a revoluble journal to either a rotary journal or another revoluble journal the centrifugal action has asserted itself as a serious hindrance, notwithstanding that the oil is initially supplied under pressure.

Accordingly, the object of this invention is to counteract centrifugal force when its exertion is not advantageous. I have succeeded in accomplishing such object by providing for a duplex communication between any pair of journals, which consists in permitting the passage of oil from one to the other simultaneously through a pair of distinct conduits, which pair are bent in opposite directions about a common center and have open communication at near ends with each other. Preferably a cycle of communication is afforded between the journals which approximates a circuitous course of travel. While it should be understood that it is not necessary to do so, I have preferred to employ a pair of oppositely curved separate tubes which establish the nearly circular communication in conjunction with ducts extending through the ends of the crank arms and in some lead to the wearing surface of the particular journal adjacent thereto.

I would have it expressly understood that I in no wise limit myself to this specific application or embodiment of my invention, which I have selected as a basis for illustrating and describing my invention merely for the purpose of rendering a clear and comprehensive understanding of the scope and novel features thereof.

Adverting to the drawings:

Figure I is a section of a crank shaft case showing a multiple crank shaft operatively mounted thereon and embodying the principle of my invention.

Fig. II is a section on line II II of Fig. I looking in the direction of the indicating arrows.

Fig. III is a section on line III III of Fig. I, following a similar direction of vision.

Fig. IV is a bottom plan solely of the middle rotary bearing of the crank shaft shown in Fig. I, certain details of the construction appearing in dotted lines.

A crank shaft case 1, which is partly broken away, has ends 2 and 3 respectively and a middle bearing support 4 a given distance above the bottom of the casing. This support is provided above with a pair of inlet openings 5 and 6, the former of which communicating with a pipe 7 to be assumed as leading to a source of lubricant under pressure. A bearing proper 8 is fitted in the support 4 and is provided with a pair of openings 9 in registry with the outlets 5 and 6 respectively. The inlet 6 is purposed to permit the entry of lubricant directly from the supply contained in the casing 1. The ends 2 and 3 are provided with bearings 10 and 11 respectively which are in axial alinement with the bearing 8. A multiple crank shaft 12 is rotatably mounted in the bearings 8, 10 and 11 and comprises three rotary journals 13, 14 and 15 actually seated therein respectively. The crank shaft furthermore includes in its structure four revoluble journals 16, 17, 18 and 19. The revoluble journal 16 is connected with the rotary journal 14 by a crank arm 20 and with the revoluble journal 17 by a crank arm 21. The rotary journal 13 is connected with the revoluble journal 17 by means of a crank arm 22 and with the revoluble journal 18 by means of a crank arm 23. The revoluble journals 18 and 19 are connected by a crank arm 24, while the rotary journal 15 and the revoluble journal 19 are connected by a crank arm 25.

Inasmuch as the principle featuring my invention is embodied in duplicated structure, only two widely differing portions thereof will be described. Each of the revoluble journals, as well as the middle of the rotary journal, is fashioned with intercommunicating ducts and each set thereof leads to and opens through the wearing surface of its particular journal. Accordingly, I will describe only the communication afforded, after the manner of my invention, between the middle rotary journal 13 and the revoluble journal 17 and a similar scheme of communication afforded between the revoluble journals 16 and 17.

The journal 13 is provided with a pair of converging ducts 26 and 27 which merge at 28 and also there open through the wearing surface as may be seen in Figs. I and IV. The end of the ducts 26 and 27 communicates with a substantially horizontal duct 29 (seen in Fig. III) which passes through the crank arm 22 and has its ends tapped as shown at 30. The revoluble journal 17, as appears in Fig. II, is fashioned with a pair of converging ducts 31 and 32 leading to a duct 33 which opens out at a wearing surface. The crank arms 21 and 22 are likewise provided on opposite sides of the journal 17 with horizontally extending ducts 34 and 35 respectively and such ducts communicate with the ducts 31 and 32 respectively. The ends of the ducts 34 and 35 are also fashioned with screw threads at 36 and 37 respectively for a purpose which will presently become manifest. The revoluble journal 16 is provided with a single bent duct 38 opening through its wearing surface at one end and leading to another horizontal duct 39 extending through the near end of the crank arm 21 as appears in Fig. II, and such duct 39 is similarly provided with screw threads 40 at its two ends.

Instead of affording direct connection through the crank arms between any pair of journals I provide a pair of separate tubes between each pair of journals and such tubes are curved in opposite directions outwardly away from the center line of the crank arm. Connecting that pair of ends of the ducts 34 and 39, which are positioned on the same side, is a tube 41 and such connection may be readily effected by the employment of a pair of unions 42. The other two ends of the ducts 34 and 39 are similarly connected by a tube 43 together with a pair of unions 44. As is clearly seen in Fig. II the configuration imparted to the tubes 41 and 43 is such that they can form, in conjunction with the ducts 34 and 39, a nearly circular outline and in so doing incidentally establish a duplex communication between the ducts 31 and 38. Similarly connecting the pair of ends of the ducts 29 and 35 which are on the same side, as is best seen in Fig. III, are a pair of tubes 45 and 46. Unions 47 serve to effect the connection of the tube 45 and a pair of unions 48 likewise effect the connection of the tube 46. Thus a looped duplex communication which is, so far as concerns the effect produced, substantially circular results between the rotary friction surface within the bearing 8 and the revoluble friction surface at the journal 17 with which it is to be assumed that some connecting rod (not shown) will articulate.

Any sufficiently skilled artisan will now have understood the manner in which the benefit of my invention becomes assured. Oil passing through the pipe 7 and inlets 5 and 9 will, with every revolution, pass through the opening 28 into the duct 26, thence through the duct 29 in each direction to be carried outwardly by the centrifugal action to the duct 35. From there it is permitted to cross the journal 17 through the ducts 32 and 31 to reach the duct 34 from which it is caused to divaricate and continuously flow to the revoluble journal 16. The continuity of flow of the oil is guaranteed owing to the complementary semi-circular tubes 41 and 43, which by reason of conforming substantially to a path concentric with reference to the axis of revolution will effectually counteract the centrifugal force, and in so doing afford an opportunity for the oil to move forward in response to the pressure under which it has been assumed it was forced through the pipe 7. Obviously the same procedure prevails elsewhere.

I claim:—

1. An oiling device comprising the combination with a revoluble journal, of means for continuously supplying oil thereto and including a conduit in the form of a complete loop, the latter extending between said journal and its axis of revolution being in open communication therearound in both directions and having a detachable section to enable access to its interior.

2. An oiling device comprising the combination of a crank shaft having a rotary journal and a revoluble journal each provided with a duct opening through the wearing surface thereof, and a pair of tubes curved in opposite directions and forming in conjunction with said ducts a duplex communication therebetween.

3. An oiling device comprising the combination of a crank shaft having a rotary journal and a revoluble journal each provided with a duct leading to the wearing surface thereof, means for supplying oil to the rotary journal, and a pair of bent conduits having near ends directed toward each other and communicating with said ducts respectively.

4. An oiling device comprising the combination of a multiple crank shaft having rotary journals and a pair of revoluble journals, each provided with ducts leading to the wearing surfaces thereof, means for conducting oil from said rotary journal to one of said revoluble journals, and a pair of arcuate tubes each communicating with both of the ducts of said revoluble journals and forming in conjunction therewith an approximate circle whereby to counteract centrifugal force and insure a continuous uniform flow therethrough.

5. An oiling device comprising the combination of a multiple crank shaft having a pair of revoluble journals each provided with a duct which opens to the wearing surface thereof, means for conducting oil to one of said journals, and means forming in conjunction with said ducts a substantially ring shaped communication therebetween whereby to counteract centrifugal force and effect a continuous flow of oil from said supplied journal to the other.

Signed by me, this 28th day of February, 1917.

FRANÇOIS RICHARD.